United States Patent
Kroehling

(10) Patent No.: US 11,314,623 B2
(45) Date of Patent: Apr. 26, 2022

(54) SOFTWARE TRACING IN A MULTITENANT ENVIRONMENT

(71) Applicant: RED HAT, INC., Raleigh, NC (US)

(72) Inventor: Juraci Paixao Kroehling, Munich (DE)

(73) Assignee: Red Hat, Inc., Raleigh, NC (US)

( * ) Notice: Subject to any disclaimer, the term of this patent is extended or adjusted under 35 U.S.C. 154(b) by 119 days.

(21) Appl. No.: 16/255,258

(22) Filed: Jan. 23, 2019

(65) Prior Publication Data
US 2020/0233779 A1 Jul. 23, 2020

(51) Int. Cl.
*G06F 11/36* (2006.01)

(52) U.S. Cl.
CPC ...... *G06F 11/3636* (2013.01); *G06F 11/3664* (2013.01)

(58) Field of Classification Search
CPC .......................... G06F 11/3636; G06F 11/3664
See application file for complete search history.

(56) References Cited

U.S. PATENT DOCUMENTS

| | | | | |
|---|---|---|---|---|
| 6,279,103 B1 * | 8/2001 | Warren | ................ | G06F 11/3636 712/227 |
| 8,418,000 B1 * | 4/2013 | Salame | ................ | G06F 11/3684 714/38.1 |
| 9,189,355 B1 * | 11/2015 | Moturu | ................ | G06F 11/3495 |
| 9,436,813 B2 | 9/2016 | Morley | | |
| 9,542,432 B2 | 1/2017 | Pelletier et al. | | |
| 9,762,589 B2 | 9/2017 | Wood et al. | | |
| 9,825,674 B1 * | 11/2017 | Leabman | ................ | H02J 50/20 |
| 10,185,647 B2 * | 1/2019 | Gao | ..................... | G06F 11/3664 |
| 10,917,357 B2 * | 2/2021 | Papaure | .................. | G06F 9/547 |
| 2002/0143784 A1 * | 10/2002 | Sluiman | ............. | G06F 11/3612 |

(Continued)

FOREIGN PATENT DOCUMENTS

CA 2495686 A1 * 4/2004 ............. G06Q 50/22

OTHER PUBLICATIONS

Kroehling, J.P., "Jaeger and Multitenancy," Medium Corporation, Oct. 27, 2017, https://medium.com/jaegertracing/jaeger-and-multitenancy-99dfa1d49dc0.

(Continued)

*Primary Examiner* — Matthew M Kim
*Assistant Examiner* — Matthew N Putaraksa
(74) *Attorney, Agent, or Firm* — Kilpatrick Townsend & Stockton LLP

(57) ABSTRACT

Software tracing can be accomplished in a multitenant environment according to various examples of the present disclosure. In one example, a processing device can receive tracing information and a tenant identifier. The tracing information can indicate a sequence in which a group of microservices forming a software application executed in response to a request transmitted to the software application. The tenant identifier can correspond to a particular tenant among a group of tenants having access to an instance of the software application. The processing device can then select, based on the tenant identifier, a particular collector from among a group of collectors corresponding to the group of tenants. The processing device can forward the tracing information to the particular collector for causing the tracing information to be stored in a datastore corresponding to the particular tenant.

20 Claims, 5 Drawing Sheets

(56) References Cited

U.S. PATENT DOCUMENTS

| | | | | |
|---|---|---|---|---|
| 2007/0180089 | A1* | 8/2007 | Fok | H04W 24/00 709/223 |
| 2007/0226699 | A1* | 9/2007 | Kato | G06F 11/3636 717/128 |
| 2009/0292744 | A1* | 11/2009 | Matsumura | G06F 9/466 |
| 2011/0072418 | A1* | 3/2011 | Kalamegham | G06F 11/3636 717/128 |
| 2011/0243291 | A1* | 10/2011 | McAllister | H04L 1/0631 375/376 |
| 2013/0124595 | A1* | 5/2013 | Oplinger | H04L 67/104 709/201 |
| 2014/0006874 | A1* | 1/2014 | Bohling | G06F 11/3471 714/45 |
| 2014/0211665 | A1* | 7/2014 | Voccio | H04L 12/1403 370/259 |
| 2015/0127993 | A1* | 5/2015 | Sankar | G06F 11/3636 714/45 |
| 2015/0172148 | A1* | 6/2015 | Ishida | H04L 41/12 709/224 |
| 2015/0271272 | A1* | 9/2015 | Mahoney | H04L 67/141 709/228 |
| 2016/0098342 | A1* | 4/2016 | Faizanullah | H04L 67/34 717/131 |
| 2016/0140031 | A1* | 5/2016 | Sun | G06N 5/02 717/128 |
| 2016/0283302 | A1* | 9/2016 | Gottschlich | G06F 11/079 |
| 2017/0063606 | A1* | 3/2017 | Babu | H04W 4/00 |
| 2018/0225192 | A1* | 8/2018 | Alagiriswamy | G06F 11/3664 |
| 2018/0270122 | A1* | 9/2018 | Brown | H04L 69/40 |
| 2018/0352499 | A1* | 12/2018 | Khoury | H04L 69/08 |
| 2019/0294525 | A1* | 9/2019 | Scheiner | G06F 11/3608 |
| 2019/0332517 | A1* | 10/2019 | Schardt | G06F 11/3419 |
| 2019/0364492 | A1* | 11/2019 | Azizi | H04W 4/029 |
| 2020/0104120 | A1* | 4/2020 | Speer | G06F 11/3688 |
| 2020/0182835 | A1* | 6/2020 | Hafenrichter | G01N 29/225 |
| 2021/0119892 | A1* | 4/2021 | Kant | G06F 11/3447 |

OTHER PUBLICATIONS

Paroni, F., "Multi-Tenancy in the API World Made Easy," Axioma, Jan. 19, 2018, https://dzone.com/articles/multi-tenancy-in-the-api-world-made-easy.

Gichevski, M., "Multi-Tenant Architecture using Java Spring and Hibernate," Interworks, Oct. 21, 2016, https://interworks.com.mk/multi-tenant-architecture-using-java-spring-and-hibernate/.

IBM Knowledge Center, "Configuring Tenants in a Multi-Tenant JSON Configuration," https://www.ibm.com/support/knowledgecenter/en/SS4U29/multitenancy.html.

https://docs.jboss.org/hibernate/orm/4.2/devguide/en-US/html/ch16.html.

https://groups.google.com/d/msg/jaeger-tracing/Crw4PgQ2A_4/Z-E9niKPCAAJ.

\* cited by examiner

```
rules: [
  rule {
    service: "A",
    service: "B",
    destination: "D1",
  },
  rule {
    service: "C",
    destination: "D2",
  },
  rule {
    service: "D",
    tags [
      "tenant":"1",
    ],
    destination: "D3",
  },
  rule {
    service: "D",
    tags [
      "tenant":"2",
    ],
    destination: "D4",
  },
  rule {
    service: "D",
    tags [
      "tenant":"3",
    ],
    destination: "D5",
  },
],
collectors: [
  collector{name: "D1", hostname: "cl1.example.com", port: 14268},
  collector{name: "D2", hostname: "cl2.example.com", port: 14268},
  collector{name: "D3", hostname: "cl3.example.com", port: 14268},
  collector{name: "D4", hostname: "cl4.example.com", port: 14268},
  collector{name: "D5", hostname: "cl5.example.com", port: 14268},
]
```

SOFTWARE TRACING IN A MULTITENANT ENVIRONMENT

TECHNICAL FIELD

The present disclosure relates generally to software tracing. More specifically, but not by way of limitation, this disclosure relates to software tracing in a multitenant environment.

BACKGROUND

Tracing is the process of tracking software activity resulting from a request being provided to a software application. Tracing is typically used for debugging purposes, and can enable a user to track the path of the request as it propagates through a complex system in order to identify sources of latency, bottlenecks, and other issues.

Tracing is especially useful for identifying problems in distributed software applications. A distributed software application is a software application that is composed of multiple subparts that are distributed from one another and run simultaneously in a distributed computing environment, as opposed to being a monolithic application. For example, some distributed software applications are formed from microservices. Microservices are self-contained stateless services that are generally designed to perform a specific task. Microservices can communicate with each other through well-defined application programming interfaces (APIs) in order to work together to generate responses to end-user requests. Individual microservices may be "owned" or developed by different developers, with each microservice being developed, updated, and deployed independently of other microservices. Software applications formed from microservices can provide improvements to scalability, robustness, isolation, and development time over conventional monolithic software-applications.

Commonly, the same instance of a distributed software application will serve more than one tenant (user or groups of users) in the distributed computing environment. This is referred to as multitenancy. These tenants may wish to perform tracing in connection with the distributed software application.

BRIEF DESCRIPTION OF THE DRAWINGS

FIG. 3 is an example of configuration data in a configuration file according to some aspects.

DETAILED DESCRIPTION

Figure 1:
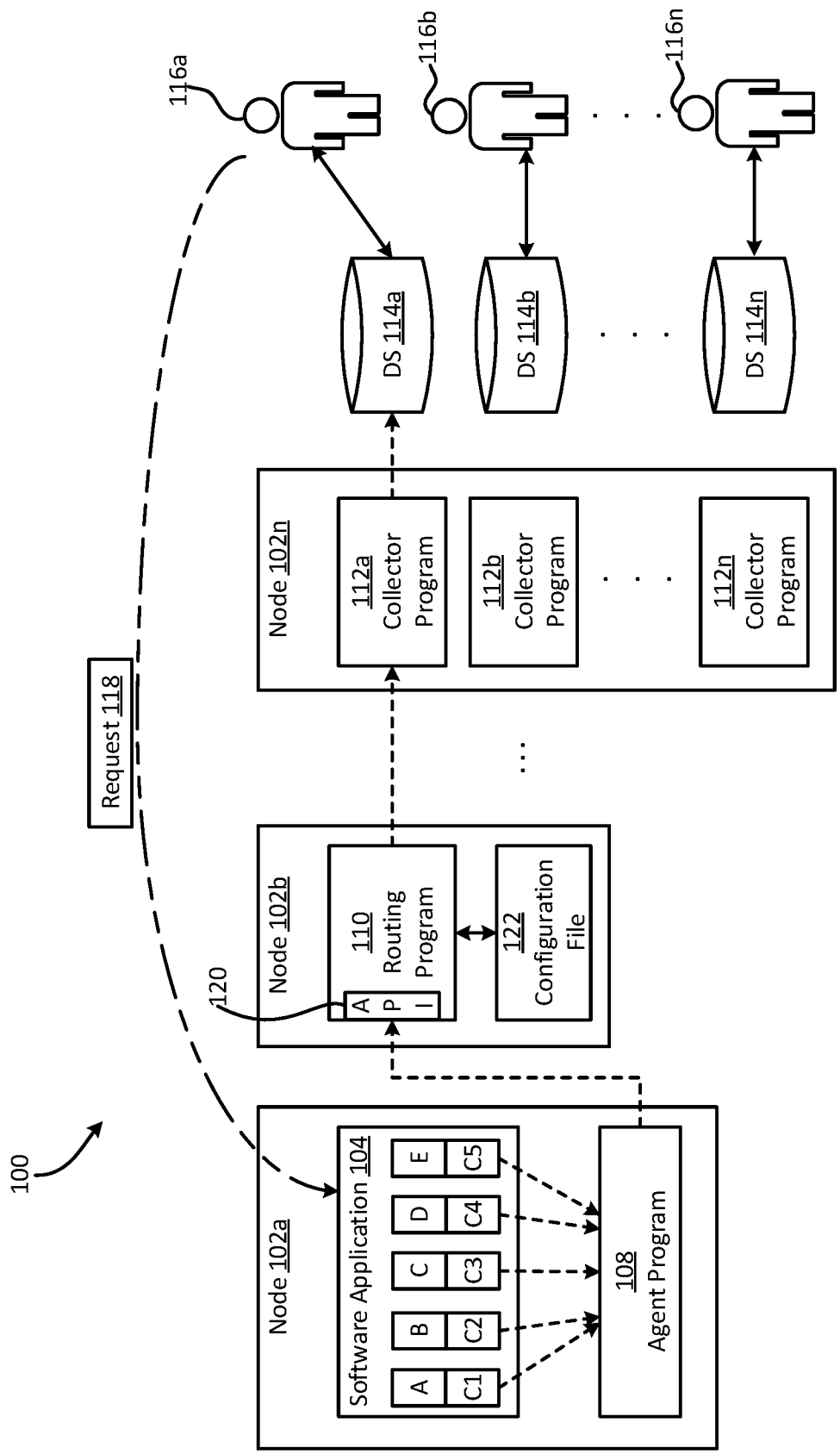
FIG. 1 is a block diagram of an example of a system for software tracing in a multitenant environment according to some aspects.

There are numerous problems with typical tracing systems. For example, multiple tenants may wish to perform tracing in connection with a distributed software application. And for various reasons, it may be desirable to delineate between each tenant's tracing results such that each tenant is only provided with its individual results. For example, it may be desirable to delineate between each tenant's tracing results because overlaps between the tracing results may obfuscate critical debugging information, jeopardize the security of the system, or increase costs. But traditional tracing systems are incapable of delineating between each tenant's tracing results.

Some examples of the present disclosure overcome one or more of the abovementioned problems by incorporating a routing program ("router") into a tracing system. The routing program can receive tracing information, determine a tenant identifier corresponding to the tracing information, and forward the tracing information to a collector program ("collector") related to that tenant identifier. The collector can store in the tracing information in a particular datastore, which is accessible to the tenant associated with the tenant identifier. This can enable each tenant's tracing information to be distinguished from the other tenant's tracing information and separately stored. The tenants can each access their respective tracing information and take any desired corrective action.

In one particular example, a cloud computing environment includes a distributed software application and a tracing system. The tracing system can be a modified version of Jaeger, which is an open source distributed tracing solution that relies on the OpenTracing framework. In this example, the tracing system includes one or more client programs ("clients") deployed alongside the distributed software application and an agent program ("agent"). The clients can obtain tracing information related to the distributed software application and, unlike traditional tracing systems, modify the tracing information to include a tenant identifier indicating the tenant to which the tracing information belongs. For example, the clients can include the tenant identifier within the tracing information (e.g., as metadata within the tracing information). The clients then transmit the modified version of the tracing information to the agent.

The agent receives the tracing information from the clients, buffers it in memory, and periodically transmits batches of the tracing information when a condition is satisfied. Since the agent is traditionally designed to transmit tracing information to (e.g., directly to) one or more collectors, the agent outputs the batches of tracing information in a format suitable to the collectors.

But, in this example, a router intercepts the batches of tracing information output by the agent before the batches reach the collectors. The router is a distinct program that is separate from the agent, clients, and collectors. The router can have a similar application programming interface (API) to a collector, such that the agent thinks that it is talking to the collector when in actuality it is talking to the router. After intercepting a batch of tracing information, the router can extract one or more tenant identifiers from the batch and correlate each tenant identifier to a respective collector related to a respective tenant. For example, the tracing system can include multiple collectors, where each collector is configured to store tracing information related to a single tenant in a datastore. The router can use a configuration file (e.g., having relationships between tenant identifiers and corresponding collectors) to determine a respective collector related to each tenant identifier in the batch. The router can then forward each piece of tracing information to its corresponding collector, which in turn can store the tracing information in connection with the corresponding tenant. In this manner, the router can intercept, distinguish, and forward tracing information to appropriate collectors in order to delineate between tracing information for different tenants.

Using a separate router to perform the above functionality (e.g., as opposed to integrating this functionality into the clients, agent, or collectors) minimizes modifications to existing tracing systems, resulting in fewer potential errors and incompatibilities. It also enables a higher degree of flexibility, since the router can be removed or updated without impacting the functionality of the clients, agent, and collector(s). It further keeps the amount of code executed by the clients, agent, and collector(s) to a minimum, enabling these components to execute sufficiently fast to avoid the latencies.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 a block diagram of an example of a system 100 for software tracing in a multitenant environment according to some aspects. The system 100 includes a distributed computing environment (e.g., a cloud computing environment) formed from multiple nodes 102a-n that may communicate with one another to perform one or more tasks. Examples of the nodes 102a-n can include servers, containers, or virtual machines.

Node 102a includes a software application 104, which in this example is formed from multiple microservices A-E. As a particular example, the software application 104 can be for an online shopping service. Microservice A can be an account service for implementing operations related to a user's account. Microservice B can be a product service for implementing operations related to displaying a product catalog. Microservice C can be a cart service for implementing operations relating to an online shopping cart. Microservice D can be an order service for implementing operations relating to placing an online order. And Microservice E can be a receipt service for implementing operations related to emailing a receipt of the online order. But in other examples, the software application 104 can be formed from any number and combination of microservices for implementing any number and combination of operations.

One or more client programs C1-C5 are deployed alongside the software application 104. For example, each of the client programs C1-C5 can be deployed in connection with a respective microservice. In one such example, each of the Microservices A-E is a respective process that includes a respective client program. This can enable the client programs C1-C5 to monitor the microservices, in order to determine (e.g., receive or generate) tracing information related to the microservices. The tracing information can result from a tenant 116a initiating tracing by transmitting a request 118 to the software application 104.

Figure 2:
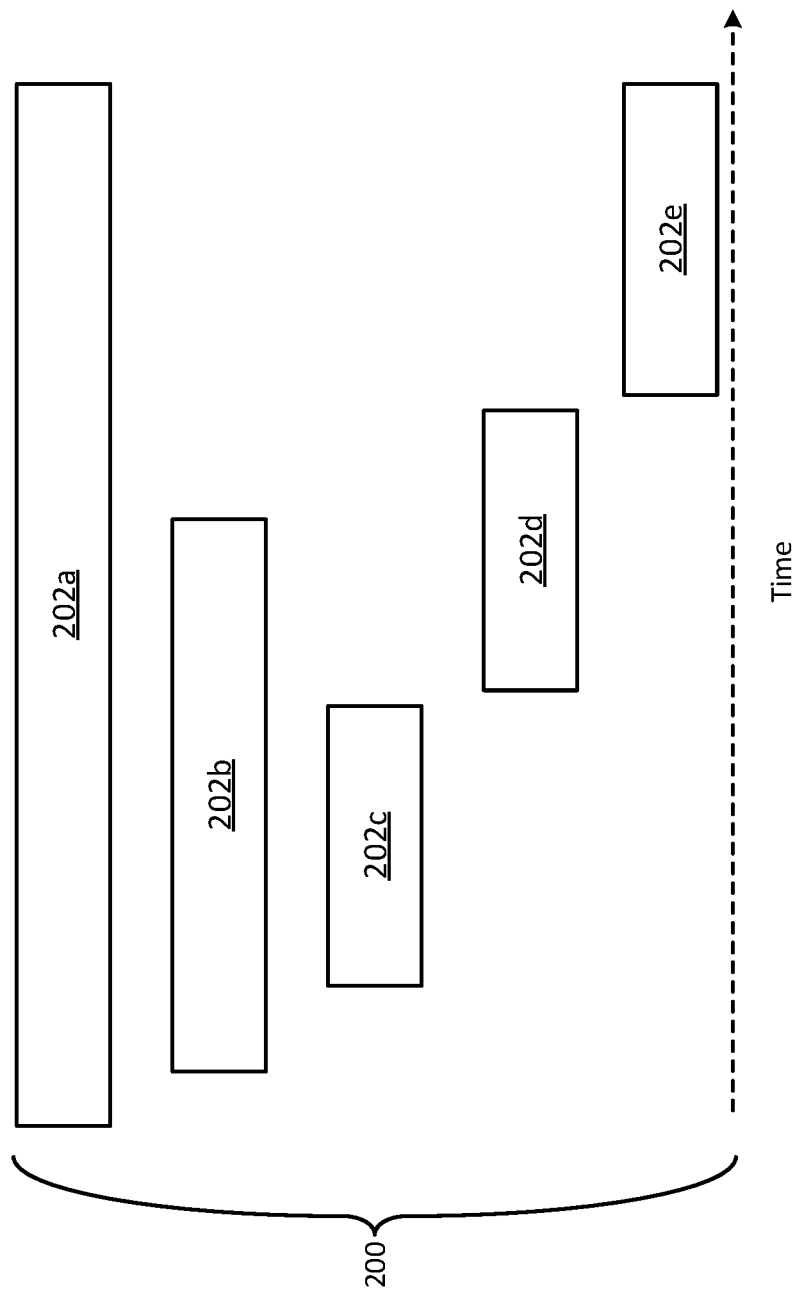
FIG. 2 is a block diagram of a trace according to some aspects.

The tracing information can include a "trace" indicating a sequence in which some or all of the microservices A-E executed in response to a request provided to the software application 104. The trace may be formed from multiple segments having a sequential, time-dependent order corresponding to the sequence in which the microservices executed. One example of a trace 200 is shown in FIG. 2. The trace 200 is formed from segments 202a-e. One example of the segments 202a-e can be "spans" in Jaeger. Each of the segments 202a-e has tracing data for a particular microservice. Examples of the tracing data can include an operation name for an operation implemented by the particular microservice, a start time for the operation, an end time for the operation, logged information related to the operation, or any combination of these, among other things. The trace and/or tracing data is usable to debug one or more of the microservices.

Referring back to FIG. 1, after determining the tracing information, the client programs C1-C5 determine one or more tenant identifiers to associate with the tracing information. Examples of the tenant identifier can be a name, username, internet protocol (IP) address, identification number, or other attribute that is specific to a particular tenant among a group of tenants 116a-n having access to the software application 104. In some examples, the client programs C1-C5 determine a tenant identifier to associate with the tracing information based on an IP address or hostname that sent the request 118. For example, the client program CL1 can map the IP address or hostname that sent the request 118 to a particular tenant identifier. In other examples, the client programs C1-C5 determine a tenant identifier to associate with the tracing information based on a tenant identifier provided with the request 118. For example, the client program CL3 can associate the same tenant identifier that was provided with the request 118 with the tracing information.

After determining which tenant identifier(s) to associate with the tracing information, the client programs C1-C5 associate the tenant identifier(s) with the tracing information. For example, client program CL1 can incorporate the tenant identifier(s) into the tracing information. This may involve, for example, setting a value of a key-value pair within the tracing information's metadata to indicate tenant 116a (e.g., "tenant=1").

Next, the client programs C1-C5 transmit the tracing information along with the tenant identifier(s) to an agent program 108. This is depicted in FIG. 1 by a dashed line between the client programs C1-C5 and the agent program 108. The agent program 108 can receive this information from the client programs C1-C5 and store it in memory. In some examples, the agent program 108 periodically transmits this information in batches when a condition is satisfied (e.g., when memory is full or a predefined amount of time has passed). The agent program 108 may transmit at least the tracing information in a format that is suitable to one or more collector programs 112a-n.

A routing program 110 receives the information (e.g., tracing information and tenant identifier(s)) from the agent program 108. This is depicted in FIG. 1 by a dashed line between the agent program 108 and the routing program 110. In some examples, the routing program 110 intercepts this information after it is output by the agent program 108 and before it can reach the collector programs 112a-n. For instance, the routing program 110 can sit between the agent program 108 and the collector programs 112a-n and serve as an intermediary there-between. The routing program 110 can have an API 120 with similar characteristics to another API (not shown) of the collector programs 112a-n, such that existing versions of agent programs can communicate with the routing program 110 without modification. For example, the API 120 of the routing program 110 can use commands and syntaxes that are similar to those used by an API of the collector programs 112a-n.

After receiving the information, the routing program 110 determines which of the collector programs 116a-n to provide with the tracing information based on the tenant identifier(s) associated with the tracing information. For example, routing program 110 can extract the tenant identifier(s) from the tracing information. The routing program 110 can then access a configuration file 122 having relationships between tenant identifiers and collector programs 112a-n, in order to determine which of the collector programs 116a-n are related the tenant identifier(s).

One example of configuration data 300 in the configuration file 122 is shown in FIG. 3. In this example, the configuration data 300 is in a JavaScript Object Notation (JSON) format, but in other examples the configuration data 300 can be in other formats. The configuration data 300 includes a series of rules in which microservices are assigned to destinations. For example, a first rule assigns all tracing information from both Microservices A and B to destination D1. A second rule assigns all tracing information from Microservice C to destination D2. A third rule assigns tracing information from Microservice D and tagged for Tenant 1 to destination D3. A fourth rule assigns tracing information from Microservice D and tagged for Tenant 2 to destination D4. And a fifth rule assigns tracing information from Microservice D and tagged for Tenant 3 to destination D5. The routing program 110 can use these rules to determine a destination to which to transmit the tracing information related to each of the microservices.

The configuration data 300 also designates each of the destinations D1-D5 as a specific collector program available at a specific address (e.g., domain name, IP address, port, or any combination of these). For example, destination D1 is designated as a collector program available on port 14268 of hostname "cl1.example.com." Destination D2 is designated as another collector program available on port 14268 of hostname "cl2.example.com." And so on. The routing program 110 can use these designations in conjunction with the rules to determine where to forward tracing information.

Referring back to FIG. 1, having determined where to route the tracing information, the routing program 110 then transmits the tracing information to the appropriate collector program(s). For example, the routing program 110 can transmit the tracing information to collector program 112a. This is depicted in FIG. 1 by a dashed line between the routing program 110 and collector program 112a. In an example in which the routing program 110 determined that the tracing information is to be forwarded to multiple collector-programs 112a-n (e.g., due to the tracing information having multiple tenant-identifiers), the routing program 110 may additionally transmit the tracing information to additional collector-programs 112a-n.

The collector programs 112a-n are each configured to receive tracing information and store the tracing information in a corresponding one of the datastores 114a-n ("DS"). For example, collector program 112a can receive tracing information from the routing program 110 and store it in datastore 114a. Collector program 112b can receive tracing information from the routing program 110 and store it in datastore 114b. And collector program 112n can receive tracing information from the routing program 110 and store it in datastore 114n. Each of the datastores 114a-n may only be accessible to a particular tenant in the group of tenants 116a-n. For example, each of the tenants 116a-n can access its respective datastore, but not the other datastores associated with the other tenants. This can improve security and prevent overlaps in tracing information. Examples of the datastores 114a-n can include a database; a subpart of a database (e.g., a table); a physical memory device, such as a hard drive or solid state drive; or virtual memory.

In the above examples, the client programs C1-C5, agent program 108, routing program 110, and collector programs 112a-n collectively form a tracing system for debugging problems related to the software application 104. By incorporating the routing program 110 into the tracing system, multiple tenants 116a-n can perform traces and receive their respective tracing results independently from one another.

Although FIG. 1 depicts one exemplary configuration of the tracing system, other configurations are possible. For instance, the client programs C1-C5, agent program 108, routing program 110, and collector programs 112a-n can be positioned on the same node or distributed among any number and combination of nodes 102a-n. And although the client programs C1-C5, agent program 108, and collector programs 112a-n are described above as having certain exemplary functionalities, these programs are not limited to having the precise set of functionalities described above. For example, these programs can have more, fewer, or different functionalities than those described above, and their functionalities may be combined, separated, or modified in any suitable way to form any number and combination of programs. Further, while the routing program 110 is described above as routing tracing information from the agent program 108 to the collector programs 112a-n, in other examples the routing program 110 can route tracing information from any suitable source program to any suitable destination program in a tracing system.

Figure 4:
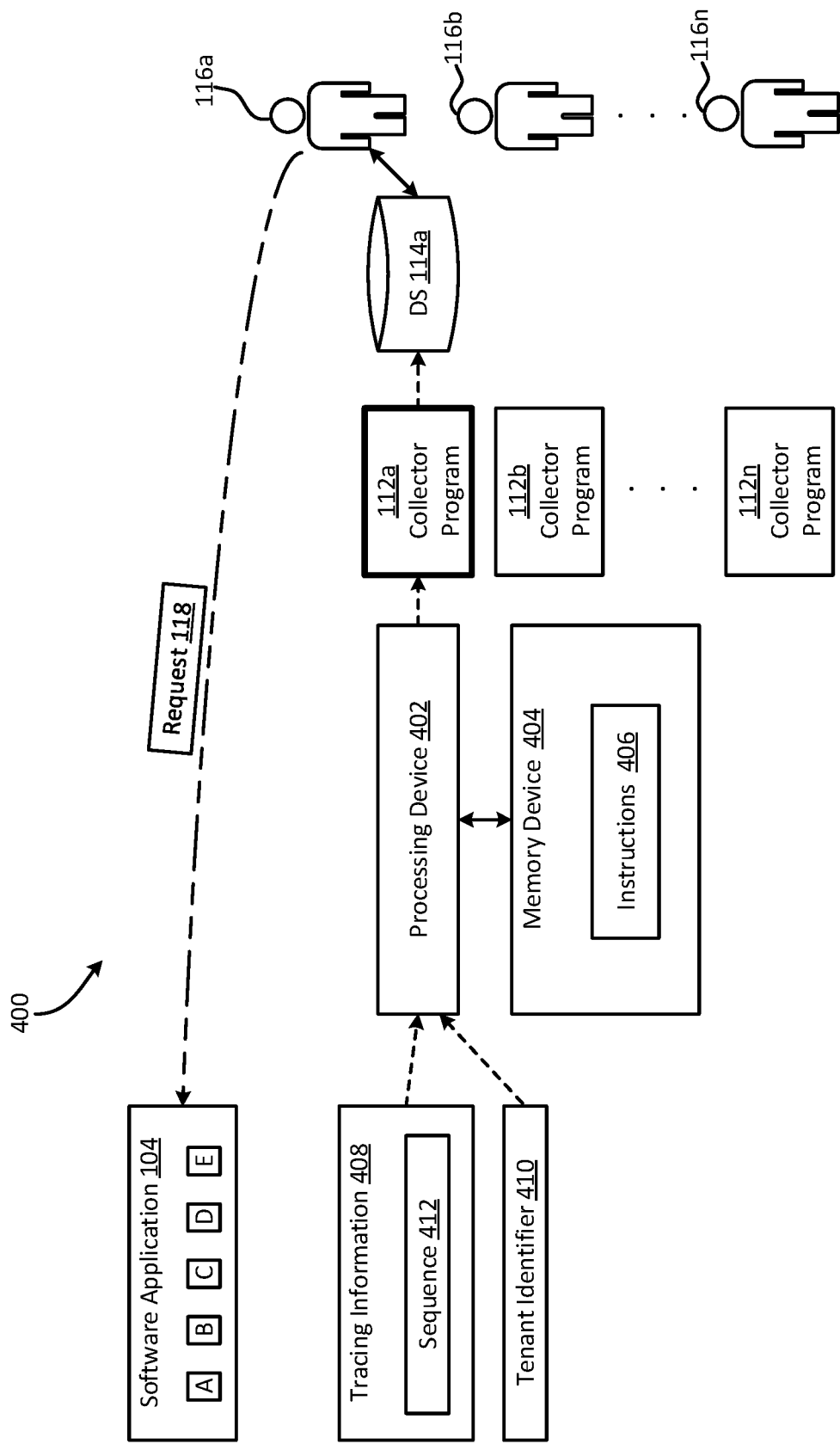
FIG. 4 is a block diagram of another example of a system for software tracing in a multitenant environment according to some aspects.

FIG. 4 is a block diagram of another example of a system 400 for software tracing in a multitenant environment according to some aspects. The system 400 includes a processing device 402 communicatively coupled with a memory device 404. In some examples, the processing device 402 and the memory device 404 can be part of a node, such as one of the nodes 102a-n of FIG. 1.

The processing device 402 can include one processing device or multiple processing devices. Non-limiting examples of the processing device 402 include a Field-Programmable Gate Array (FPGA), an application-specific integrated circuit (ASIC), a microprocessor, etc. The processing device 402 can execute instructions 406 stored in the memory device 404 to perform operations. In some examples, the instructions 406 can include processor-specific instructions generated by a compiler or an interpreter from code written in any suitable computer-programming language, such as C, C++, C#, etc.

The memory device 404 can include one memory device or multiple memory devices. The memory device 404 can be non-volatile and may include any type of memory device that retains stored information when powered off. Non-limiting examples of the memory device 404 include electrically erasable and programmable read-only memory (EEPROM), flash memory, or any other type of non-volatile memory. In some examples, at least some of the memory device can include a medium from which the processing device 402 can read instructions 406. A computer-readable medium can include electronic, optical, magnetic, or other storage devices capable of providing the processing device 402 with computer-readable instructions 406 or other program code. Non-limiting examples of a computer-readable medium include magnetic disk(s), memory chip(s), ROM, random-access memory (RAM), an ASIC, a configured processor, optical storage, or any other medium from which a computer processor can read the instructions 406.

In some examples, the processing device 402 can receive tracing information 408 and a tenant identifier 410. The tracing information 408 can indicate a sequence 412 in which a plurality of microservices (e.g., Microservices A-E) forming a software application 104 executed in response to a request 118 transmitted to the software application 104. The tenant identifier 410 can correspond to a particular tenant 116a among a plurality of tenants 116a-n having access to an instance (e.g., the same instance) of the software application 114. The processing device 402 can then select, based on the tenant identifier 410, a particular collector 112*a* from among a plurality of collectors 112*a-n* corresponding to the plurality of tenants 116*a-n*. An example of the selected collector program 112*a* is shown in bold in FIG. 4. The processing device 402 can then forward the tracing information 408 to the particular collector 112*a* for causing the tracing information 408 to be stored in a datastore 114*a* corresponding to the particular tenant 116*a*.

Figure 5:
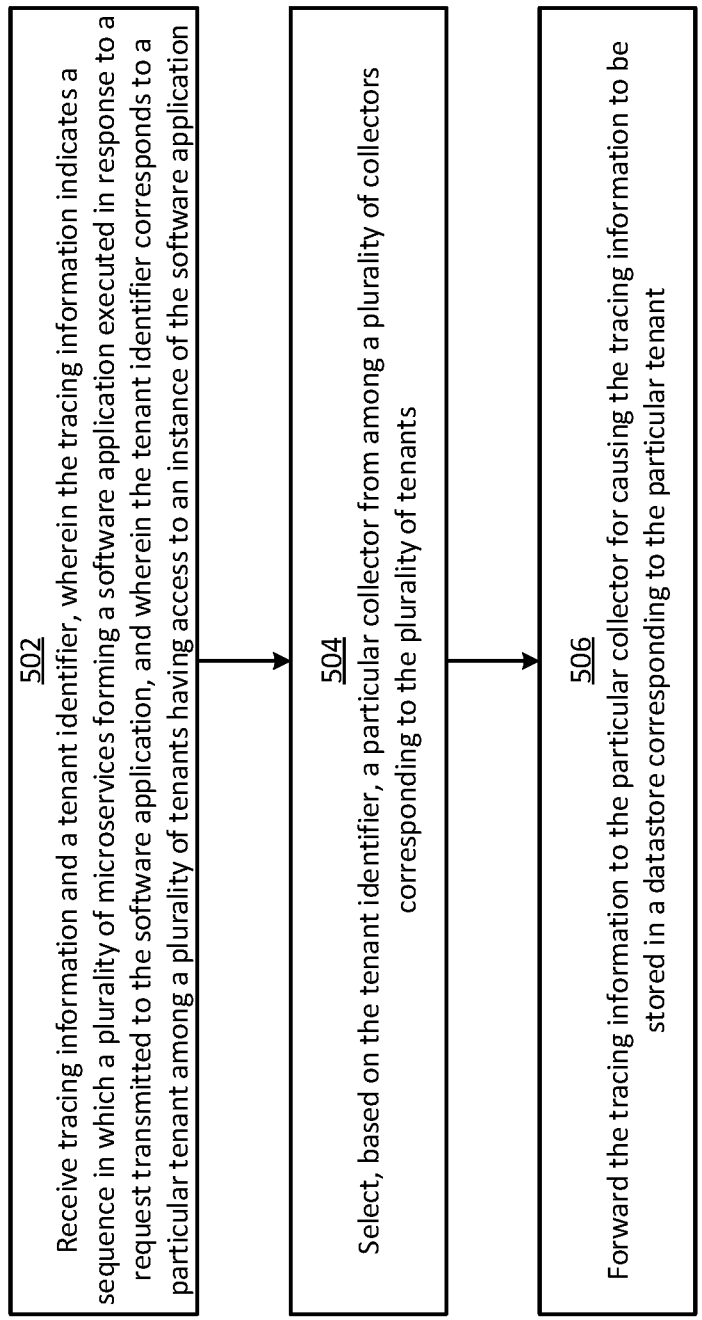
FIG. 5 is a flow chart of an example of a process for software tracing in a multitenant environment according to some aspects.

In some examples, the processing device 402 can implement some or all of the steps shown in FIG. 5. Other examples can include more steps, fewer steps, different steps, or a different order of the steps than is shown in FIG. 5. The steps of FIG. 5 are discussed below with reference to the components discussed above in relation to FIG. 4.

In block 502, the processing device 402 receives tracing information 408 and a tenant identifier 410. The tracing information 408 indicates a sequence 412 in which a plurality of microservices forming a software application 104 executed in response to a request 118 transmitted to the software application 104. The tenant identifier 410 corresponds to a particular tenant 116*a* among a plurality of tenants 116*a-n* having access to an instance of the software application 114.

In block 504, the processing device 402 selects, based on the tenant identifier 410, a particular collector 112*a* from among a plurality of collectors 112*a-n* corresponding to the plurality of tenants 116*a-n*. For example, the processing device 402 can use a configuration file, an external database, or internal logic to determine which of the collectors 112*a-n* is assigned to the tenant identifier. The processing device 402 can then select the particular collector 112*a* assigned to the tenant identifier.

In block 506, the processing device 402 forwards the tracing information 408 to the particular collector 112*a* for causing the tracing information 408 to be stored in a datastore 114*a* corresponding to the particular tenant 116*a*. For example, the processing device 402 can forward the tracing information 408 to the particular collector 112*a*, which can receive the tracing information 408 and store it in the datastore 114*a*.

Thereafter, the tenant 116*a* may be able to access the tracing information 408 as desired. For example, the tenant 116 can connect to the system 400 via a client computer (e.g., a laptop computer or desktop computer) in order to access a graphical user interface produced by the system 400. The graphical user interface can include at least some of the tracing information 408 and/or other tracing information stored in the datastore 114*a*. The tenant 116*a* can interact with the graphical user interface to view the tracing information 408 at varying levels of detail and in a variety of formats, which may aid in interpreting the tracing information and debugging.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processing device; and
a memory device including instructions that are executable by the processing device for causing the processing device to:
receive tracing information and a tenant identifier, wherein the tracing information corresponds to a software application including a plurality of microservices, the tracing information indicating a sequence in which the plurality of microservices executed in response to a request transmitted to the software application, and wherein the tenant identifier corresponds to a particular tenant among a plurality of tenants, the plurality of tenants having access to a same instance of the software application that is at a particular location;
select, based on the tenant identifier, a particular collector from among a plurality of collectors corresponding to the plurality of tenants; and
forward the tracing information to the particular collector for causing the tracing information to be stored in a datastore corresponding to the particular tenant.

2. The system of claim 1, wherein the tracing information comprises the tenant identifier, and wherein the memory device further includes instructions that are executable by the processing device for causing the processing device to:
extract the tenant identifier from the tracing information; and
select the particular collector based on a relationship in a configuration file between (i) the tenant identifier corresponding to the particular tenant and (ii) a collector identifier corresponding to the particular collector,
wherein the configuration file includes a plurality of relationships between a plurality of tenant identifiers corresponding to the plurality of tenants and a plurality of collector identifiers corresponding to the plurality of collectors.

3. The system of claim 1, wherein:
the tracing information is formed from a plurality of segments having a sequential order that corresponds to the sequence in which the plurality of microservices executed, each segment having respective tracing data for a respective microservice among the plurality of microservices.

4. The system of claim 3, wherein the respective tracing data includes an operation name for an operation implemented by the respective microservice, a start time for the operation, an end time for the operation, and logged information related to the operation.

5. The system of claim 1, wherein:
the particular tenant is a first tenant, the particular collector is a first collector, the tenant identifier is a first tenant identifier, and the datastore is a first datastore; and
the memory device further includes instructions that are executable by the processing device for causing the processing device to:
select a second collector from among the plurality of collectors based on a second tenant identifier provided with the tracing information, the second tenant identifier corresponding to a second tenant among the plurality of tenants; and
forward the tracing information to both the first collector and the second collector for causing the tracing information to be stored in the first datastore corresponding to the first tenant and a second datastore corresponding to the second tenant, respectively.

6. The system of claim 1, wherein:
a first node in a distributed computing environment comprises the software application and an agent program configured to transmit the tracing information; and
a second node in the distributed computing environment comprises a routing program that is formed from the instructions and configured to serve as an intermediary between the agent program and the plurality of collectors.

7. The system of claim 6, wherein the agent program is configured to output the tracing information in a format suitable to the plurality of collectors, and wherein the routing program is configured to intercept the tracing information from the agent program and forward the tracing information to the particular collector based on the tenant identifier.

8. A method comprising:
receiving, by a processing device, tracing information and a tenant identifier, wherein the tracing information corresponds to a software application including a plurality of microservices, the tracing information indicating a sequence in which the plurality of microservices executed in response to a request transmitted to the software application, and wherein the tenant identifier corresponds to a particular tenant among a plurality of tenants, the plurality of tenants having access to a same instance of the software application;
selecting, by the processing device and based on the tenant identifier, a particular collector from among a plurality of collectors, wherein each collector in the plurality of collectors is configured for storing a respective set of tracing information in a respective datastore among a plurality of datastores associated with the plurality of tenants, each respective datastore of the plurality of datastores being accessible to a respective tenant of the plurality of tenants for retrieving the respective set of tracing information stored for the respective tenant; and
based on selecting the particular collector, forwarding, by the processing device, the tracing information to the particular collector for causing the tracing information to be stored in the respective datastore that is accessible to the particular tenant.

9. The method of claim 8, wherein the tracing information comprises the tenant identifier, and further comprising:
extracting the tenant identifier from the tracing information; and
selecting the particular collector based on a relationship in a configuration file between (i) the tenant identifier corresponding to the particular tenant and (ii) a collector identifier corresponding to the particular collector, wherein the configuration file includes a plurality of relationships between a plurality of tenant identifiers corresponding to the plurality of tenants and a plurality of collector identifiers corresponding to the plurality of collectors.

10. The method of claim 8, wherein:
the tracing information is formed from a plurality of segments having a sequential order that corresponds to the sequence in which the plurality of microservices executed, each segment having respective tracing data for a respective microservice among the plurality of microservices.

11. The method of claim 10, wherein the respective tracing data includes an operation name for an operation implemented by the respective microservice, a start time for the operation, an end time for the operation, and logged information related to the operation.

12. The method of claim 8, wherein the particular tenant is a first tenant, the particular collector is a first collector, the tenant identifier is a first tenant identifier, and the respective datastore accessible to the particular tenant is a first datastore; and further comprising:
selecting a second collector from among the plurality of collectors based on a second tenant identifier provided with the tracing information, the second tenant identifier corresponding to a second tenant among the plurality of tenants; and
forwarding the tracing information to both the first collector and the second collector for causing the tracing information to be stored in the first datastore corresponding to the first tenant and a second datastore corresponding to the second tenant, respectively.

13. The method of claim 8, wherein:
a first node in a distributed computing environment comprises the software application and an agent program that outputs the tracing information; and
a second node in the distributed computing environment comprises a routing program that serves as an intermediary between the agent program and the plurality of collectors, wherein the routing program is executed by the processing device to implement the steps of receiving the tracing information, selecting the particular collector, and forwarding the tracing information to the particular collector.

14. The method of claim 13, wherein the agent program outputs the tracing information in a format suitable to the plurality of collectors, and wherein the routing program intercepts the tracing information from the agent program and forwards the tracing information to the particular collector based on the tenant identifier.

15. A non-transitory computer-readable medium comprising program code that is executable by a processing device for causing the processing device to:
receive tracing information and a tenant identifier, wherein the tracing information indicates a sequence in which a plurality of microservices forming a software application executed in response to a request transmitted to the software application, and wherein the tenant identifier corresponds to a particular tenant among a plurality of tenants, the plurality of tenants having access to a same instance of the software application for enabling the plurality of tenants to transmit requests to the same instance of the software application;
select, based on the tenant identifier, a particular collector from among a plurality of collectors corresponding to the plurality of tenants; and
based on selecting the particular collector, forward the tracing information to the particular collector for causing the tracing information to be stored in a datastore corresponding to the particular tenant.

16. The non-transitory computer-readable medium of claim 15, wherein the tracing information comprises the tenant identifier, and further comprising program code that is executable by the processing device for causing the processing device to:
extract the tenant identifier from the tracing information; and
select the particular collector based on a relationship in a configuration file between (i) the tenant identifier corresponding to the particular tenant and (ii) a collector identifier corresponding to the particular collector.

17. The non-transitory computer-readable medium of claim 15, wherein:
the tracing information is formed from a plurality of segments having a sequential order that corresponds to the sequence in which the plurality of microservices executed, each segment having respective tracing data for a respective microservice among the plurality of microservices.

18. The non-transitory computer-readable medium of claim 15, wherein:
the particular tenant is a first tenant, the particular collector is a first collector, the tenant identifier is a first tenant identifier, and the datastore is a first datastore; and
further comprising program code that is executable by the processing device for causing the processing device to:
select a second collector from among the plurality of collectors based on a second tenant identifier provided with the tracing information, the second tenant identifier corresponding to a second tenant among the plurality of tenants; and
forward the tracing information to both the first collector and the second collector for causing the tracing information to be stored in the first datastore corresponding to the first tenant and a second datastore corresponding to the second tenant, respectively.

19. The non-transitory computer-readable medium of claim 15, wherein the program code forms a routing program that is configured to serve as an intermediary between at least two other programs in a tracing system.

20. The non-transitory computer-readable medium of claim 19, wherein the at least two other programs include a source program and a destination program, and wherein the routing program is configured to receive the tracing information from the source program and route the tracing information to the destination program based on the tenant identifier.

* * * * *